United States Patent [19]
Bullock et al.

[11] 4,297,817
[45] Nov. 3, 1981

[54] EARTHEN-COVERED STRUCTURE AND PANEL USED THEREIN

[76] Inventors: Ralph Bullock; Orland E. Skibinski, both of P.O. Box 78, Irvington, Ill. 62848

[21] Appl. No.: 127,257

[22] Filed: Mar. 4, 1980

[51] Int. Cl.³ ............................................. E02D 27/00
[52] U.S. Cl. ................................... 52/169.6; 52/807; 52/742
[58] Field of Search ............... 52/169.6, 742, 73, 79.1, 52/79.8, 807, 808

[56] References Cited

U.S. PATENT DOCUMENTS

| | | | |
|---|---|---|---|
| 3,462,897 | 8/1969 | Weinrott | 52/169.14 |
| 3,762,112 | 10/1973 | Evans | 52/79.8 |
| 3,885,368 | 5/1975 | King | 52/73 |
| 4,141,184 | 2/1979 | Vidal | 52/742 |

OTHER PUBLICATIONS

*Underground Housing is Comming on Strong* by David Herbert ©Sep. 1979, Better Homes and Gardens.
*Family Shelter Designes*, Mar. 1962 by Department of Defence, pp. 15–18.
*All–Weather Wood Foundation System*, ©1978 by American Plywood Association.

*Primary Examiner*—Price C. Faw, Jr.
*Assistant Examiner*—Henry E. Raduazo
*Attorney, Agent, or Firm*—Harvey B. Jacobson

[57] ABSTRACT

An earthen-covered dwelling or other structure having a portion of the peripheral wall exposed to atmosphere to provide access and natural light to the dwelling with the remaining peripheral wall and roof being covered by a layer of earth of substantial thickness sufficient to insulate the dwelling thermally and acoustically and reducing the quantity of energy necessary to maintain the interior of the dwelling comfortable for the occupants even when the atmosphere is extremely hot or cold. The roof and walls are constructed of strong, load bearing panels each of which includes studs and end members covered by sheets of rigid material and an encapsulation of glass fiber reinforced resinous plastic. The panels have interengaged edges for rigidly interconnecting the panels and the roof panels have built-in shallow crests and valleys. A filler layer of sand is placed on the roof and a water impervious membrane is placed over the external surface of those portions of the dwelling in engagement with the soil and a heavier water impervious membrane is placed over the sand filler with the layer of earth positioned over the membranes.

4 Claims, 11 Drawing Figures

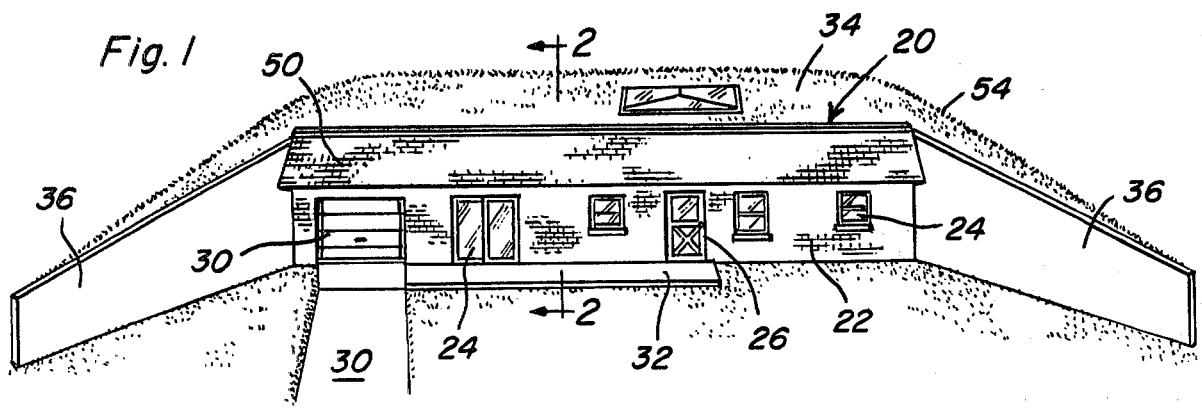
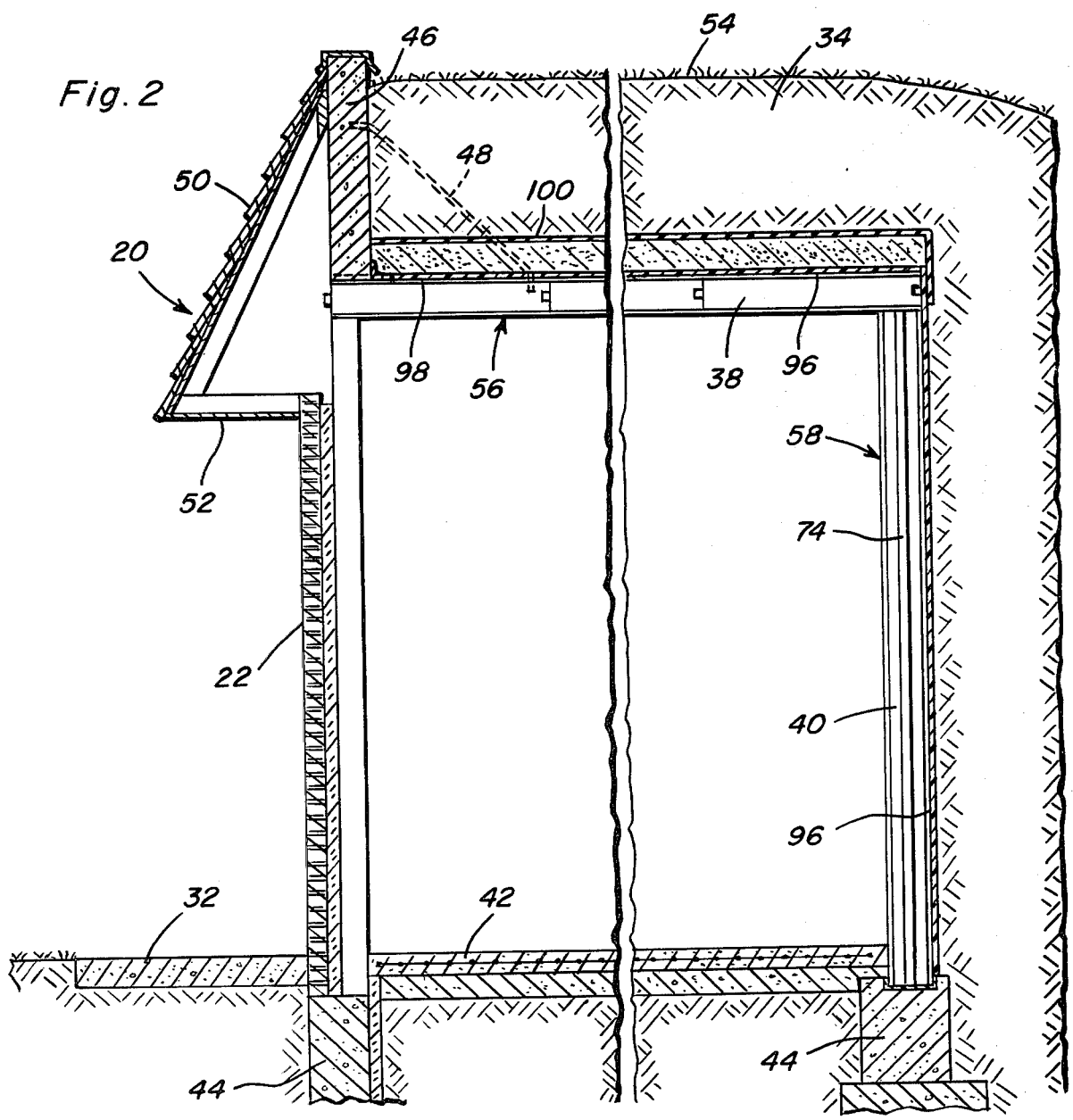

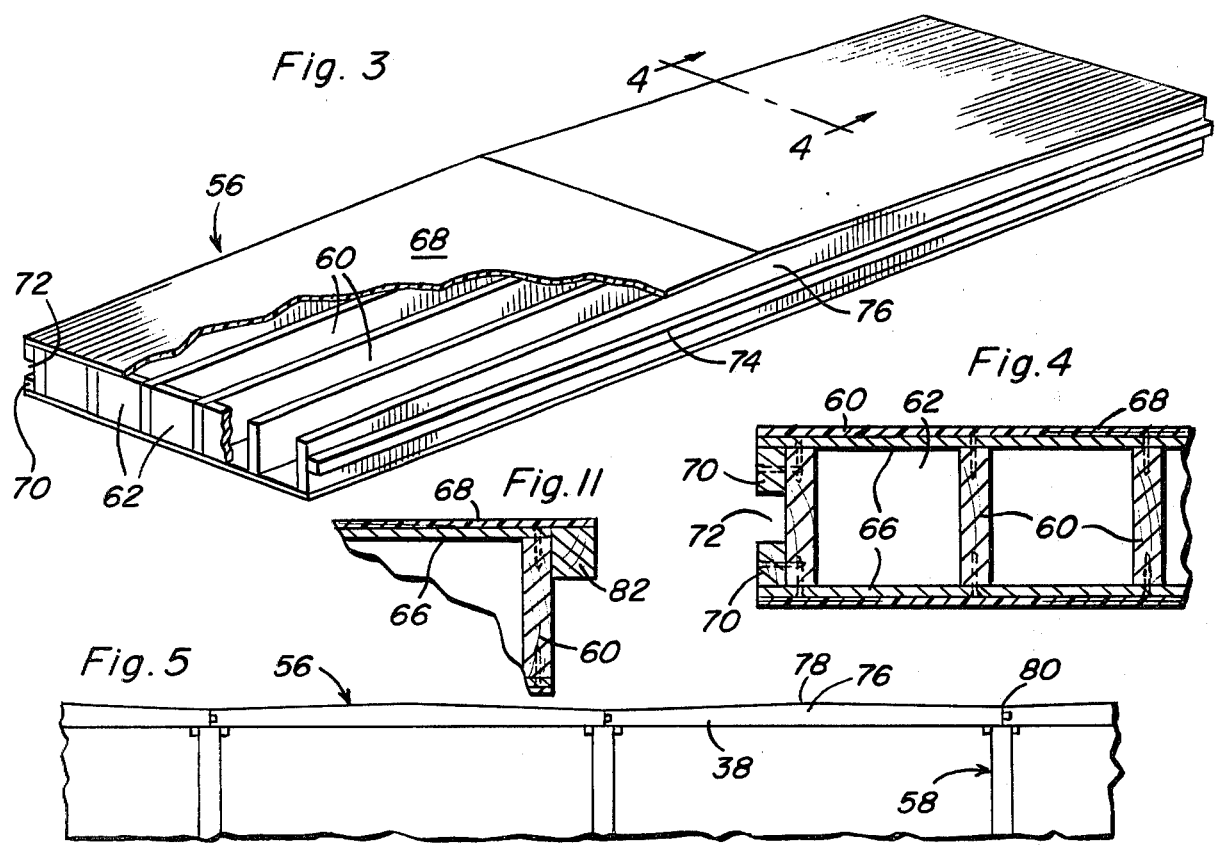
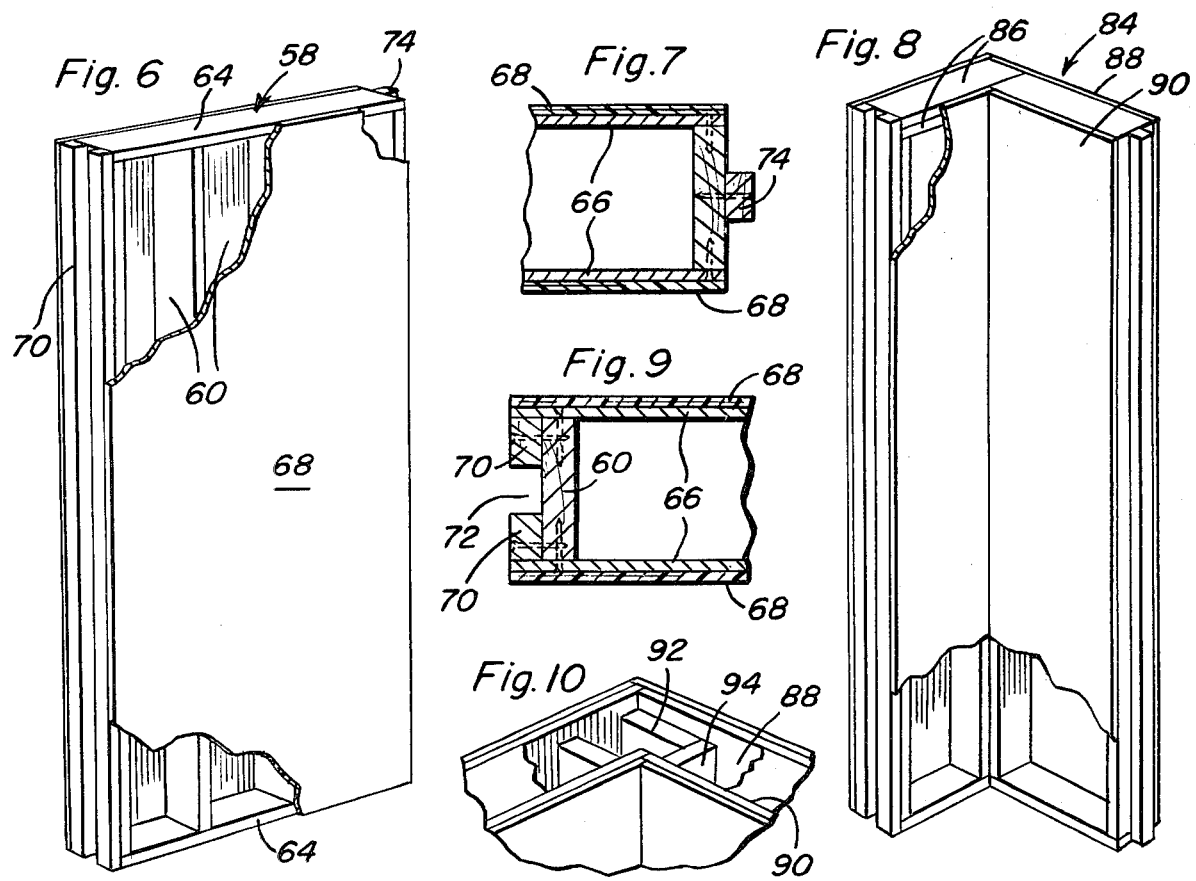

EARTHEN-COVERED STRUCTURE AND PANEL USED THEREIN

BACKGROUND OF THE INVENTION

1. Field of the Invention

The present invention generally relates to a structure such as a building, dwelling or the like which is at least partially earthen-covered and including a front wall portion which is exposed to atmosphere to provide access and natural light to the interior of the structure, the remainder of the peripheral wall and roof being earthen-covered with the roof and wall being constructed from a unique prefabricated panel arrangement in which the modular panels have interengaging peripheral edge portions for locking the panels in aligned relation and each of the panels being constructed of a plurality of longitudinal studs interconnected by end members and covered with rigid sheathing and an encapsulation of glass fiber reinforced plastic to provide a strong hollow core panel capable of withstanding loads encountered in an earthen-covered structure.

2. Description of the Prior Art

Efforts previously have been made to construct various types of structures below ground including warehouse-type structures, office buildings, dwellings and the like. In many instances, building occupants prefer not to be below ground and many problems exist relating to the manner in which such structures are constructed so that they are not only economically feasible but also acceptable to the people which occupy the underground structure. The following U.S. Pat. Nos. disclose various types of prefabricated panels utilized in building structures and/or exemplary of the developments in this type of panel: 887,674, 3,643,393, 2,332,732, 3,785,913, 3,389,033, 3,886,706.

SUMMARY OF THE INVENTION

An object of the present invention is to provide an earthen-covered structure incorporating a plurality of wall and roof panels therein each of which is of hollow core construction and provided with interengaging peripheral edge portion.

Another object of the invention is to provide an earthen-covered structure in accordance with the preceding object in which the earthen-covered structure includes a front wall which is exposed to the atmosphere with the remainder of the peripheral wall and the roof being covered with soil to insulate the structure thermally and acoustically with the panels being capable of supporting predetermined loads and provided with a glass fiber reinforced plastic encapsulating material on the exterior thereof to preclude the entry of moisture when the joint between adjacent panels is sealed with a suitable sealant and the entire surface of the panels exposed to the earth is provided with a water impervious film or membrane.

A further object of the invention is to provide an earthen-covered structure with each of the panels including a plurality of parallel studs having rigid sheathing glued and nailed thereto to form a load bearing structure.

Still another object of the invention is to provide an earthen-covered structure in accordance with the preceding objects in which a sand fill is provided exteriorly of the water impervious film or membrane and a heavier duty rubber film or membrane is provided over the sand fill to preclude damage to the water impervious characteristics of the structure in the event the layer of earth has rocks or other rigid members which would tend to penetrate the water impervious film or membrane.

Yet another important object of the present invention is to provide a prefabricated panel employed in an earthen-covered structure in which the panel is provided with a hollow core and interengaging means around the periphery thereof with the interengaging means including a tongue and groove construction or a half lap construction.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of an earthen-covered structure in accordance with the present invention.

FIG. 2 is a vertical sectional view taken substantially upon a plane passing along section line 2—2 of FIG. 1.

FIG. 3 is a perspective view, with portions broken away, of a typical panel utilized in constructing the roof and walls of the present invention.

FIG. 4 is a sectional view taken substantially upon a plane passing along section line 4—4 of FIG. 3 illustrating the specific structural details of the panels.

FIG. 5 is a schematic elevational view illustrating the shallow crests and valleys in the roof panel arrangement.

FIG. 6 is a perspective view, with portions broken away, illustrating another version of the wall panel.

FIG. 7 is a sectional view, illustrating the connection between certain components of the wall panel.

FIG. 8 is a perspective view, with portions broken away illustrating a corner panel structure.

FIG. 9 is a fragmental sectional view illustrating further structural relationships of one end of the panel.

FIG. 10 is a fragmental perspective view illustrating further structural details of the corner panel.

FIG. 11 is a fragmental sectional view illustrating the half lap joint between panels.

DESCRIPTION OF THE PREFERRED EMBODIMENTS

FIG. 1 of the drawings illustrates a typical earthen-covered structure contemplated in the present invention and is in the form of a housing or dwelling generally designated by numeral 20 and adapted for use as living quarters. The earthen-covered structure may vary in dimensional configuration as well as ultimate use and, in the embodiment illustrated, includes a front wall 22 which is exposed to the atmosphere and includes windows 24, an access door 26, a garage door 28, an associated driveway 30 and walkway 32 with the arrangement of these components being varied depending upon the installation requirements and the desires of the builder or owner. The earthen-covered structure 20 is provided with a covering of earth or soil 34 of substantial depth and outwardly extending retaining walls 36 may be provided at each end of the front wall 22 so that the area in front of the house may be in the form of a yard in a conventional manner with the exposed front wall 22 providing natural light and access to the interior of the structure 20.

The structure 20 includes a roof 38 and a peripheral wall 40 which may include a straight rear wall and perpendicular end walls or any arrangement of walls connected with the front wall 22 to provide a peripheral wall for the structure. A floor structure 42 is also provided and properly installed footings 44 or other foundation structure may be provided for the floor and building in a conventional and well known manner. The front edge of the roof 38 is provided with an upstanding retaining wall 46 which may be braced with respect to the roof by diagonal brace 48. Extending forwardly and downwardly from the retaining wall 46 is an inclined front roof portion 50 terminating forwardly of the upper edge of the front wall 22 and connected thereto by an overhanging horizontal soffit 52 with the inclined roof 50 being provided with the usual roofing materials employed in housing structures and the retaining wall is provided with the usual top cap and the soil layer 34 may be provided with a grass covering 54 or the like.

The roof and wall are constructed of a plurality of prefabricated panels generally designated by numerals 56 and 58 and illustrated in FIGS. 3 and 6. In each type of panel, a plurality of longitudinally extending and spaced parallel studs 60 are provided and are interconnected by end members 62 or 64 with the end members 62 being sectional and extending flush with the ends of the studs whereas the end members 64 overlie the ends of the studs. Attached to opposite faces of the studs and end members is a rigid sheet of material 66 in the form of conventional plywood, or similar rigid structural sheathing. In addition, a layer of glass fiber reinforced plastic material 68 encapsulates the outer surface of each of the sheets 66. One outermost stud is provided with a pair of spaced parallel projections 70 defining a groove 72 whereas the opposite edge stud is provided with a centrally located projection 74 defining a tongue for interlocking engagement with the groove 72 when the panels are interconnected. In the panel 56 illustrated in FIG. 3 which is used in the roof, the studs 60 are constructed with a slightly higher central portion 76 to define shallow ridges 78 and valleys 80 in the roof 38 as illustrated in FIG. 5 whereas the panels 58 are of the same thickness throughout their dimension. The sheathing 66 is nailed and glued to the studs and end members and the projections 70 and 74 are likewise nailed and glued into position.

FIG. 11 illustrates a modified version of the interengagement between adjacent panels with this panel including a single projection 82 along each edge of the panel with the thickness of the projection being substantially one-half the thickness of the panel to provide a half-lap joint when the panels are assembled. Also, the projections may be provided on only the opposite sides of the panels or around all four sides thereof.

FIG. 8 illustrates a corner panel generally designated by numeral 84 which has the same structural arrangement but in this embodiment, the end members are doubled as at 86 and at the corner intersection, the outer sheathing 88 is longer than the inner sheathing 90 with certain of the studding 92 and 94 being arranged in perpendicular relation to provide an outside corner panel. Correspondingly, inside corner panels may be provided where necessary and panels may also be provided for the front wall which include window inserts, door inserts and the like necessary to accommodate the door and window arrangements selected for the dwelling.

The entire external surface of the roof and wall is covered by a film of plastic material designated by numeral 96 which is in the form of a water impervious membrane such as 6 mil polyethylene. Over the roof, there is provided a sand filler 98 and over the sand filler is a heavy duty rubber membrane 100 which extends throughout the area of the roof and has end portions which depend downwardly alongside the end walls with the soil layer 34 overlying the sand fill and membrane 100 which may be of rubber material. The sand filler maintains the integrity of the water impervious film 96 by preventing penetration of rocks and the like into engagement with the film 96. Also, each of the joints between adjacent panels are provided with a suitable sealant to maintain the water impervious integrity of the structure.

The dimensional characteristics of the panels may vary with the roof panel being constructed to withstand 550 lbs. per sq. ft. with the studs being preferably 2 inches by 10 inches on 9-inch centers with the sheathing being 5/8 inch plywood glued and nailed to the studs with the end members or spacers 62 being 2 inches by 8 inches. The glass fiber layer on the surface of the panel exposed to the earth will be of two layers of mat having a total thickness approximately ⅛ inch whereas the inside of the panel will be one layer of mat having a total thickness approximately 1/16 inch with this mat being applied in a conventional manner with suitable resin coatings which technique is well known. The wall panels 58 are designed to withstand 7,500 lbs. per lineal foot with the studs being 2-inch by 6-inch wood members with the end members also being 2-inch by 6-inch wood members and the sheathing and glass fiber reinforced plastic material being the same as on the roof panels. While a single level dwelling has been disclosed, multiple levels may be provided if desired. Also, various room layouts may be provided and the total square feet of living area may also be varied depending upon the requirements of the owner of the dwelling. The laminated wall and roof panels of this invention are described in Structural Engineering Bulletin No. 998 issued Oct. 23, 1979 by U.S. Department of Housing and Urban Development. A copy of this bulletin is incorporated herein and contitutes a portion of the disclosure of this invention and is identified as Appendix A. Also, attached to this application and identified as Appendix B and constituting a portion of this disclosure is a test report by A & H Engineering Corporation, dated Sept. 4, 1979, resulting from tests conducted on Aug. 29, 1979, with these attachments indicating the capability of the panels withstanding the loads normally encountered in this type of structure and indicating the acceptability of such panels in the construction of housing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An earthen-covered building structure comprising a floor, upstanding peripheral wall and a roof, said wall including a front portion exposed to ambient atmosphere, all of the other wall portions and roof being covered by a layer of earth of substantial thickness to substantially reduce the quantity of energy necessary to maintain conditions comfortable to the occupants of the building structure, and a water impervious member covering the exterior of the roof and walls engaged by the earth, said roof and walls being constructed of a plurality of panels, means sealing the peripheral edges of said panels, means on the periphery of each panel for interlocking engagement with the edge of an adjacent panel, each panel comprising a plurality of generally parallel spaced studs interconnected by end members, a sheet of substantially rigid plywood attached to opposite surfaces of the studs and end members to define a hollow core panel, and an encapsulating material completely covering the exterior surfaces of said sheets, said encapsulating material being a glass fiber reinforced plastic, each of the roof panels having studs with a higher central section to form parallel shallow crests and valleys, said plywood sheets being nailed and glued to said studs and end members to provide an integrated panel which is capable of limited deflection under load without cracking or failure, said roof and wall panels forming the only load bearing components of the building structure.

2. The building structure as defined in claim 1 together with a layer of sand completely covering said roof, a water impervious membrane completely covering the portion of the sand layer over the roof, and an earthen layer overlying the membrane.

3. The building structure as defined in claim 2 wherein the front of said building is open to the atmosphere and is provided with an upwardly extending retaining wall for retaining the sand and earthen layers over the roof.

4. The building structure as defined in claim 3 wherein said retaining wall includes a downwardly and outwardly slanted roof eave defining an overhanging soffit, and windows and access door means in said front wall.

* * * * *